United States Patent [19]

Caywood, Jr.

[11] E Patent Number: Re. 31,680

[45] Reissued Date of Patent: Sep. 18, 1984

[54] CERTAIN EPDM COPOLYMER/MALEIC ANHYDRIDE ADDUCTS AND THERMOPLASTIC ELASTOMERS THEREFROM

[75] Inventor: Stanley W. Caywood, Jr., Wilmington, Del.

[73] Assignee: E. I. Du Pont de Nemours and Company, Wilmington, Del.

[21] Appl. No.: 394,462

[22] Filed: Jul. 1, 1982

Related U.S. Patent Documents

Reissue of:

[64] Patent No.: 3,884,882
Issued: May 20, 1975
Appl. No.: 322,360
Filed: Jan. 10, 1973

[51] Int. Cl.[3] ..... C08F 255/06

[52] U.S. Cl. ..... 525/285; 525/331.7

[58] Field of Search ..... 525/285, 331.7, 327.6, 525/327.8

[56] References Cited

U.S. PATENT DOCUMENTS

| | | | |
|---|---|---|---|
| 2,608,550 | 8/1952 | Rowland | 260/78.5 |
| 2,844,502 | 7/1958 | Paxton | 161/92 |
| 2,933,480 | 4/1960 | Gresham | 260/80.5 |
| 3,231,498 | 1/1966 | de Vries | 252/56 |
| 3,240,762 | 3/1966 | Wilks | 260/78.4 |
| 3,260,708 | 7/1966 | Natta | 260/79.5 |
| 3,403,011 | 9/1968 | Sweeney | 44/62 |
| 3,427,183 | 2/1969 | Portolani | 117/76 |
| 3,527,736 | 9/1970 | Averink | 260/78.4 |
| 3,567,691 | 3/1971 | Van Breen | 260/78.4 |
| 3,644,248 | 2/1972 | Luijk | 524/399 |

FOREIGN PATENT DOCUMENTS

| | | |
|---|---|---|
| 1551717 | 11/1968 | France . |
| 46240 | 6/1963 | Luxembourg . |

*Primary Examiner*—Paul R. Michl

[57] ABSTRACT

An adduct of maleic anhydride and an elastomeric copolymer of ethylene, at least one $C_3$–$C_6$ $\alpha$-olefin, and at least one nonconjugated diene; the adduct having an inherent viscosity of at least one as measured on 0.1 gram of adduct dissolved in 100 milliliters of perchloroethylene at 30° C. and having a gel content less than about 5 percent as measured by weight percent adduct insoluble in boiling tetrahydrofuran at atmospheric pressure after 48 hours. Also, a process of making the adduct and thermoplastic elastomers prepared from the adduct.

5 Claims, No Drawings

CERTAIN EPDM COPOLYMER/MALEIC ANHYDRIDE ADDUCTS AND THERMOPLASTIC ELASTOMERS THEREFROM

Matter enclosed in heavy brackets [ ] appears in the original patent but forms no part of this reissue specification; matter printed in italics indicates the additions made by reissue.

BACKGROUND OF THE INVENTION

This invention relates to adducts prepared by the thermal addition of maleic anhydride to elastomeric coplymers of ethylene and propylene which have a substantially saturated hydrocarbon backbone chain and unsaturated hydrocarbon side-chains. This invention also relates to thermoplastic elastomers prepared from such adducts.

Grafting of maleic anhydride to polyolefins by free radical initiated reactions is well known in the art. U.S. Pat. No. 3,236,917 to Natta et al, for example, discloses adducts prepared by heating a mixture of ethylene/propylene copolymer and maleic anhydride in the presence of an organic peroxide which initiates the addition reaction by the generation of free radicals. Among other reactions, a molecule of the maleic anhydride grafts onto two copolymer chains thereby cross linking the polymer. This cross-linking is irreversible. The adduct may be further cross-linked by a basic compound such as zinc oxide.

Numerous other suggestions have been made for grafting maleic anhydride to synthetic elastomers, followed by cross-linking with a metal oxide to form a thermoplastic elastomer. U.S. Pat. No. 3,644,248 to Luijk, for example, discloses addition of maleic anhydride to polyisoprene during mastication or in the presence of an organic peroxide followed by cross-linking with a Group II or IV divalent metal oxide.

Such processes utilize free radicals, either generated by shearing stresses during mastication or by heating organic compounds such as peroxides, to prepare the maleic anhydride/elastomer adduct. The free radical mechanism of adduct formation, however, has certain disadvantages. Namely, free radicals cause a molecule of maleic anhydride to add to two elastomer molecules, thereby cross-linking the elastomer. Free radicals can also react with the elastomer to introduce cross-linking. The degree of cross-linking in raw elastmeric polymers is commonly expressed in terms of gel content.

Uncontrolled cross-linking, as shown by a high gel content, tends to cause the uncured elastomeric polymer to have poor processing characteritics such as poor milling properties and slow extrusion rates. Poor tensile strengths and short break are also commonly observed in cured elastomers derived from elastomeric polymers which, in the raw or uncured state, have high gel content.

The art has proposed use of free radical inhibitors to control cross-linking during the additon of maleic anhydride to elastomers having polyunsaturated backbones. Thus, Canadian Pat. No. 543,006 discloses the addition of maleic anhydride to Hevea rubber in the presence of a free radical inhibitor. Resulting adduct, when prepared in a press or autoclave, is still preferably treated with breakdown aids to reduce cross-linking prior to subsequent compounding and processing.

SUMMARY OF THE INVENTION

This invention provides adducts prepared by the thermal addition of maleic anhydride to elastomeric copolymers of ethylene, at least one $C_3$ to $C_6$ $\alpha$-olefin, and at least one nonconjugated diene. The adducts have an inherent viscosity of at least one as measured on 0.1 gram of adduct dissolved in 100 milliliters of perchloroethylene at 30° C. and have a gel content less than about 5 percent as measured by weight percent adduct insolube in boiling tetrahydrofuran at atmospheric pressure after 48 hours.

The adducts are particularly suited for the preparation of thermoplastic elastomers by curing the adduct with a metal salt of a weak acid, preferably in the presence of a promotor having an active hydrogen atom.

DETAILED DESCRIPTION OF THE INVENTION

Elastomeric copolymers of ethylene, at least one $C_3$ to $C_6$ $\alpha$-monoolefin, and at least one nonconjugated diene are well known in the art. These copolymers have a substantially saturated hydrocarbon backbone chain which causes the copolymer to be relatively inert to ozone attack and oxidative degradation and have side-chain unsaturation available for sulfur curing.

These copolymers are conveniently prepared by copolymerizing the monomers in the presence of a coordination catalyst system such as diisobutylaluminium chloride and vanadium oxytrichloride. Copolymerization may be conducted in an inert solvent or in a slurry or particle form reactor. Details of their preparation are given, for example, in U.S. Pat. No. 2,933,480; 2,962,451; 3,000,866; 3,093,620; 3,093,621; 3,063,973; 3,147,230; 3,154,528; 3,260,708; and in M. Sittig, "Stereo Rubber and Other Elastomer Processes." Noyes Development Corporation. Park Ride, N.J. 1967.

Propylene is normally selected as the $\alpha$-mono-olefin in preparing such copolymers because of its availability and for reasons of economics. Other lower $\alpha$-monoolefins, such as 1-butene, 1-pentene, and 1-hexene can be selected in place of or in addition to propylene in preparing elastomeric copolymers which are useful in practicing the invention. The term EPDM as used herein refers to the preferred copolymers of ethylene, propylene, and at least one nonconjugated diene.

An especially preferred class of EPDM is that in which the nonconjugated diene is monoreactive. Monoreactive nonconjugated dienes have one double bond which readily enters the copolymerization reaction with ethylene and propylene, and a second double bond which does not, to any appreciable extent, enter the copolymerization reaction. Copolymer of this class have maximum side chain unsaturation for a given diene content, which unsaturation is available for adduct formation. Gel content of these copolymers is also minimal since there is minimal cross-linking during copolymerization.

Monoreactive nonconjugated dienes which can be selected in preparing this preferred class of EPDM copolymer include linear aliphatic dienes of at least six carbon atoms which have one terminal double bond and one internal bond, and cyclic dienes wherein one or both of the carbon-to-carbon double bonds are part of a carbocyclic ring. Of the linear dienes, copolymers of ethylene, propylene, and 1,4-hexadiene having an inherent viscosity of at least about 1.5 are especially preferred.

Class of cyclic dienes useful in preparing the preferred class of EPDM copolymers for adduct formation includes alkylidene bicycloalkenes [, alkenyl bicycloalkenes, bicycloalkadienes, and alkenyl cycloalkenes]. Representative of alkylidene bicycloalkenes are 5-alkylidene-2-norbornenes such as 5-ethylidene-2-norbornene and 5-methylene-2-norbornene. [Representative of alkenyl bicycloalkenes are 5-alkenyl-2-norbornenes such as 5-(1'-propenyl)-2-norbornene, 5-(2'-butenyl)-2-norbornene, and 5-hexenyl-2-norobornene. Dicyclopentadiene and 5-ethyl-2,5-norbornadiene are illustrative of bicycloalkadienes, and vinyl cyclohexene is representative of alkenyl cycloalkenes which may be selected as the diene monomer.] EPDM copolymers prepared from cyclic dienes preferably have an inherent viscosity within the range of about 1.5 to 3.0, as measured on 0.1 gram copolymer dissolved in 100 milliliters of perchloroethylene at 30° C., for optimum processing properties. Of the cyclic dienes, 5-ethylidene-2-norbornene is preferred.

Another class of preferred copolymers includes branched tetrapolymers made from ethylene, at least one $C_3$ to $C_6$ $\alpha$-monoolefin with propylene being preferred, at least one monoreactive nonconjugated diene, and at least one direactive nonconjugated diene such as 2,5-norbornadiene or 1,7-octadiene. By "direactive" is meant that both double bonds are capable of polymerizing during preparation of the copolymer. Tetrapolymers of this class preferably have an inherent viscosity of about 1.2 to 3.0, as measured on 0.1 gram copolymer dissolved in 100 milliliters of perchloroethylene at 30° C., for optimum processing properties. A preferred copolymer of this class is a tetrapolymer of ethylene, propylene, 1,4-hexadiene, and 2,5-norbornadiene. Such copolymers are descried in Canadian Pat. Nos. 855,774 and 897,895.

Copolymers of the classes defined above have low gel content, a substantially saturated hydrocarbon backbone which is resistant to ozone and oxidative degradation, and hydrocarbon side-chain unsaturation which presents a situs for the thermal addition of maleic anhydride. Low gel content is indicative of a polymer having favorable processing properties.

Using a copolymer of ethylene, propylene, and 1,4-hexadiene, thermal addition of maleic anhydride to the copolymer is theorized to occur by the following equation:

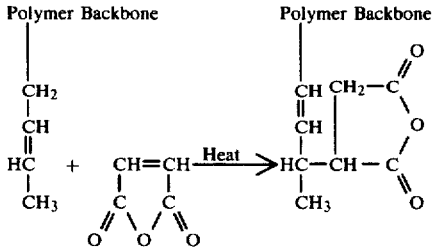

A molecule of maleic anhydride adds to the polymer at the site of side chain unsaturation to give a succinic anhydride racical bonded to the side chain. Side chain unsaturation shift by one carbon atom. It will be understood that side chain unsaturation can also shift away from the backbone chain when the unsaturation is several carbon atoms removed from the terminal side chain carbon atom, as in copolymer of ethylene, propylene, and 1,4-octadiene.

The adducts of this invention can be prepared by any proces which intimately mixes maleic anhydride with the copolymer without appreciable generation of free radicals, and which concurrently or subsequently heats the mixture to a temperature whereat thermal addition occurs. Selected temperatures will generally be at least 225° C. to obtain adduct formation at acceptable rates and less than about 350° C. to avoid any significant polymer breakdown. Preferred temperature ranges will vary with the particular polyme and can readily be determined by one skilled in the art.

Mixing of the maleic anhydride and copolymers can be by blending molten anhydride with copolymer in an internal mixer or extruder, or by blending finely divided dry maleic anhydride with copolymer on a well-ventilated rubber mill with concurrent or subsequent heating, such as in a hot press or mold. Temperatures necesary to achieve thermal grafting are sufficiently high to dehydrate maleic acid, forming maleic anhydride in situ. Thus, maleic acid can be compounded with the copolymer instead of maleic anhydride when such is desired. The maleic anhydride can be substituted with groups, such as bromine or chlorine, which do not unduly interfere with the graft reaction.

Preferred copolymers of ethylene, propylene, and 1,4-hexadiene are very resistant to free radical formation under high shear stress conditions and are readily mixed on conventional bulk processing equipment without gel formation Care must be exercised, however, in selecting the mixing conditions for copolymers derived from strained ring dienes such as ethylidene norbornene. Such copolymers will readily generate free radicals when sheared at low temperatures, and are preferably mixed with maleic anhydride at high temperature, such as above 90° C. to avoid appreciable gel formation.

It is generally desired to form adducts containing about 0.5 to 9 percent, and preferably about 1 to 4 percent, by weight maleic anhydride. Adducts containing such quantities of maleic anhydride have sufficient carboxylated sites for ionic curing or grafting of the copolymer. To achieve a desired degree of adduct formation within a reasonable time, high concentrations of reactants are helpful. One will generally select a polymer having about twice the amount of side-chain unsaturation as is stoichiometrically required for the desired amount of maleic anhydride incorporation. Similarly, about twice as much maleic anhydride is added as is desired in the polymer adduct. Conversion of about 40 to 50 percent of the maleic anhydride will result in copolymer adduct having the desired compositions. For example, if one desires to obtain an ethylene/propylene/1,4-hexadiene copolymer having 2.2 weight percent maleic anhydride content, he could conveniently mix a copolymer having 0.49 moles side-chain unsaturation per kilogram of polymer with 0.49 moles maleic anhydride and heat the mixture to about 45 percent of the anhydride, thereby obtaining the desired product.

Unreacted maleic anhydride is conveniently removed from the adduct by extraction with water. During washing, a portion of grafted maleic anhydride (now a succinic anhydride) is hydrolyzed to grafted succinic acid. When the polymer adduct is used to prepare a thermoplastic elastomer, it is not necessary to regenerate the anhydride groups.

If desired, the anhydride groups are readily regenerated by heating while removing evolved water vapor. The heating can conveniently be accomplished while subjecting the graft polymers to mechanical shearing which generates at least a portion of the required heat. For instance, the graft copolymer can be processed on a rubber mill at 120° C. to regenerate anhydride groups. Alternatively, anhydride groups can conveniently be regenerated by heating sheets of the graft copolymer overnight at 115° C. in a vacuum oven. Higher heating temperatures expedite regeneration.

Unreacted maleic anhydride can also be removed from the copolymer/maleic anhydride adduct by dissolving the adduct in a solvent which will not dissolve maleic anhydride. Such as hexane, decanting the solution, and recovering the adduct from solution. Alternatively, both adduct and unreacted maleic anhydride are dissolved in a mutual solvent, such as tetrahydrofuran,- followed by precipitation of the adduct with a nonsolvent such as anhydrous acetone. Unreacted maleic anhydride remains in the acetone/tetrahydrofuran solution.

The adducts of this invention have a substantially saturated hydrocarbon backbone chain and have an inherent vicosity of at least 1.0, preferably at least 1.5, as measured on 0.1 gram graft copolymer dissolved in 100 milliliters of perchloroethylene at 30° C. The adducts have a gel content less than 5 percent, and generally less than 2 percent, as measured by weight percent adduct which is insoluble in boiling tetrahydrofuran at atmospheric pressure after 48 hours. Low gel content indicates that the adducts can readily be blended with agents such as carbon black, antioxidants, etc., using standard equipment such as a rubber mill or extruder.

The adducts have special utility in preparation of thermoplastic elastomers. In such applications the adduct is compounded with a metal salt of a weak acid and then heated to form salt aggregates between adduct molecules.

Preferred metal salt curing agents are divalent Group II A or B metal salts of weak acids. Included in this preferred group are metal oxides, such as magnesium or preferably zinc oxide, and metal salts of weak carboxylic acids, phenoxides, and $\beta$-diketonates such as calcium catecholate and magnesium acetylacetonate. Metal salts of other groups may be selected. For example, the curing agent can be sodium acetate, potassium carbonate, copper acetylacetonate, tetraisobutyltitanate, tin octoate, lead acetylacetonate, chromium acetylacetonate, nickel acetylacetonate, aluminum acetylacetonate or iron acetylacetonate.

The adduct curing rate will vary with the particular adduct, curing agent, curing temperature, intimacy of contact between adduct and curing agent, and whether the adduct cure sites are anhydride groups or carboxylic acid groups formed by opening the anhydride groups. While the curing agent will form salt aggregates with anhydride group cure sites, high temperatures such as 250° C. are generally required to accomplish curing within a reasonable time.

More favorable curing times and temperatures can be selected, and generally a better cure can be obtained, when the grafted anhydride groups are open to make carboxylic acid groups available for curing. Compounds which perform this ring-opening function have an active hydrogen atom and are defined herein as accelerators.

Water is an excellent accelerator. In combination with metal oxide curing agents, organic acids (such as stearic acid, acetic acid, salicyclic acid, benzoic acid, and oleic acid) are also excellent accelerators since they produce water in situ during the neutralization as well as provide solubilization of the cation as discussed hereinafter. Amino acids (such as 11-aminoundecanoic acid, 6-aminohexanoic acid, and 4-aminobutyric acid) are especially preferred as they convert small residual amounts of unreacted maleic anhydride to innocuous form, removing the practical requirement that unreacted maleic anhydride be eliminated from the adduct piror to further processing. Other compounds useful as accelerator include mercaptans, thiols, phenols, alcohols, and amines.

Polyfunctional accelerators, such as diamines, are generally avoided when a thermoplastic product is desired since they may permanently cross-link the adduct, forming an intractable product.

Accelerator may be introduced in a variety of ways. For instance, the adduct gradually absorbs sufficient water vapor to cause curing, in the presence of a curing agent, even at ambient temperatures. But the quantity of water absorbed is dependent on time and temperature, long times are required for favorable curing, and adduct compositions cured in this manner do not possess predictable tensile properties.

More consistent and rapid curing is obtained by exposing compounded adduct and curing agent to a controlled atmosphere of accelerator such as steam or ammonia vapor. Alternatively, the compounded adduct can be immersed in liquid accelerator such as aqueous potassium hydroxide or ammonia. Preferably, liquid or solid accelerator is compounded with the adduct. Compounding is conveniently performed on a rubber mill or in an internal mixer concurrent with the compounding of adduct and curing agent.

Selection of optimum quantities of curing agent is within the skill of the art. The optimum quantity will vary with the metal and counterion of the curing agent, and with the nature of the accelerator. Generally, 100 percent neutralization is avoided when the only available anion for the metal is the grafted polymer carboxylate anion since intractable product can be formed. By "100 percent neutralization" is meant formation of salt aggregates at all available curing sites.

Most curing agents are not soluble in the adduct to any appreciable extent and only a small percent of the curing agent is actually involved in curing. Unreacted curing agent generally does not greatly affect room temperature tensile properties of the cured adduct, and consequently, greater than stoichiometric quantities of curing agent are used. More efficient curing is obtained when a complexing ion is present which solubilizes the metal cation of the curing agent. For example, stearic acid may be used in conjunction with zinc oxide to greatly reduce the quantity of zinc oxide required to achieve desired tensile properties. The stearic acid acts both as an accelerator and a a solubilizing agent for the zinc cation.

Especially favorable results are obtained when compounds such as zinc acetate dihydrate, hydrated zinc acetylacetone, and hydrated zinc catecholate are used alone as a curing agent or together with zinc oxide as an accelerator. such compounds provide water as an acclerator and also help solubilize zinc oxide. When the counterion of zinc is not volatile at curing temperatures, or when a nonvolatile anion such as the anion of stearic acid is also present, it has been found that thermoplastic elastomeric adducts are prepared even at 100 percent neutralization.

Optimum curing conditions can readily be determined for a particular formulation of adduct, curing agent, and accelerator by testing tensile properties obtained over a range of curing times and temperature. For adducts of maleic anhydride and ethylene/propylene/1,4-hexadiene copolymer, excellent cures are obtained within 30 minutes at 160° C. using 4 phr. zinc acetate with a promoter, hydrated zinc catecholate alone or in combination with zinc oxide, or zinc oxide with 4-aminobutyric acid or 11-aminoundecanoic acid. When zinc oxide with stearic acid promoter is selected for curing, equivalent cures are obtained when the curing time is extended at 160° C., although the cure is less reliable in that it depends somewhat on the heat history of the adduct. Hot mixing of the adduct and curing agents has been found to be especially beneficial in expediting cure times.

Conventional additives such as carbon black and processing oils may be compounded with the adduct prior to, concurrent, or subsequent to the compounding with the divalent metal salt of a weak acid. Antioxidants should be added if the thermoplastic elastomer will be exposed to prolonged high temperature usage.

Adducts so cured possess tensile properties comparable to those achieved by conventional sulfur-curing techniques. They are thermoplastic materials and can readily be reshaped by heating to temperatures above about 180° C. Such thermoplastic elastomers can be processed in known manner, such as by extrusion or molding, to form films, hoses, and other useful articles of commerce such as gaskets.

The adducts may also be permanently cross-linked by polyfunctional curing agents, such as diamines, to prepare an elastomer which may be used in place of conventional sulfur cured EPDM rubbers. Thus, the irreversibly cured adduct may be used in the manufacture of hoses, gaskets, shock absorbers, and the like.

In addition, the uncured adduct has readily available carboxylated sites which can be used for grafting of functional groups to the elastomeric copolymer for special applications. For example, the uncured adduct can be further reacted with pivalolactone to prepare thermoplastic elastomers as described in copending U.S. Pat. application Ser. No. 268,056, filed June 30, 1972.

In the examples that follow all proportions, parts, and percentages are by weight unless otherwise indicated, and all testing is at 25° C. in accordance with ASTM standards unless otherwise indicated. Gel content is that portion of the graft copolymer, in percent, which is insoluble in boiling tetrahydrofuran at atmospheric pressure after 48 hours.

Copolymer EPHD used in the examples has a Mooney (ML-1+4/121° C.) viscosity of about 35 and the following monomer unit composition: ethylene, 61.4 weight percent; propylene, 32 weight percent, 1,4-hexadiene, 6.6 weight percent. The copolymer has about 0.5 gram mole of ethylenic unsaturation per kilogram of copolymer. The Wallace plasticity is about 28 at 100° C. The inherent viscosity, as measured on 0.1 gram copolymer EPHD dissolved in 100 milliliters of perchloroethylene at 30° C., is about 2.0.

EXAMPLE 1

A Werner and Pfleider 53 mm twin screw extruder is assembled by end-to-end attachment of 16 barrel sections of ½ inch dimeter. Following a short feed section are four reaction sections (zones 1–4), one vacuum port section (zone 5), a cooling section (zone 6), and a die section. Provisions are made for the metering of molten maleic anhydride at the forward part of zone 1. The screws are composed of kneading blocks, reverse pitch screws, and transport screws arranged to generate10-0–200 psi pressure in zones 1–4 and no pressure in zone 5. The free volume of zones 1–5 is equivalent to two pounds of polymer at operating temperature. Zones 1–4 are preheated to 300° C., zone 5 to 260° C., and zone 6, the cross-head, and the die to 150° C.

Copolymer EPHD is fed to the extruder in the form of chips which pass a ½ inch screen. Maleic anhydride is metered to the extruder at an average feed rate of 4.8 percent of the polymer weight. The screw speed is 12 rpm and the vacuum port is operated at about 25 inches Hg.

The product, extruded at the rate of 6.15 lb/hr., has a maleic anhydride content of 2.23 percent as determined by a calibrated infrared method and 2.19 percent by weight as determined by titration in tetrahydrofuran with 0.1 M tetrabutylammonium hydroxide in methanol. Wallace plasticity of the product is 32 and gel content is less than about 5 percent.

Following purification of a small sample by solution in tetrahydeofuran and precipitation with anhydrous acetone, the maleic anhydride content is 2.19 percent and 2.05 percent by weight, respectively, by infrared and titration determination. The gel content is less than about 5 percent. The inherent viscosity is 1.5 as measured on 0.1 gram of adduct dissolved in 100 milliliters of perchloroethylene at 30° C.

EXAMPLE 2

A 4 inch×8 inch rubber mill is used to mix 20 grams of maleic anhydride with 200 grams of copolymer EPHD at about 25° C. The milled mixture is then heated in a closed mold in a press at 260° C. for 30 minutes, and cooled to room temperature. The infrared spectrum of the product shows absorption bands characteristic of the anhydride group, and infrared quantitative analysis indicates a maleic anhydride content of 2.4 percent by weight. Analysis for oxygen gives 1.3 percent by weight corresponding to 2.5 percent by weight maleic anhydride.

The reaction product is dissolved in hexane and filtered to remove a small amount (about 5 percent) of insoluble polymer believed introduced in the copolymer feed. The hexane solution is washed with water to remove any free maleic anhydride and the polymer is precipitated by adding acetone to the hexane solution. The precipitated polymer contains 2.1 percent by weight maleic anhydride by quantitative infrared analysis and 2.2 percent by weight maleic anhydride by oxygen analysis. The gel content is less than about 5 percent.

EXAMPLE 3

A 6 inch×12 inch rubber mill is used to mix 50 grams of maleic anhydride with 500 grams of copolymer EPHD. The mixture is then heated in a closed mold in a press at about 288° C. for 30 minutes. The resulting adduct is washed with distilled water on a wash mill to remove unreacted maleic anhydride and then heated in a vacuum oven at 130° C. for 8 hours to dry the polymer and to convert grafted maleic acid (the anhydride being hydrolyzed by water washing) to grafted maleic anhydride. Infrared spectrum of the polymer shows only anhydride absorption. Quantitative infrared analysis shows the polymer contains 3.7 percent by weight maleic anhydride. Gel content is less than about 5 percent.

EXAMPLE 4

To demonstrate prior art free radical grafting a mixture of 100 grams of copolymer EPHD and 0.048 grams of "Luperco" 101×L commercial organic peroxide and 5.88 grams of maleic anhydride is prepared on a well-ventilated rubber mill. The resulting mixture is then heated in a closed mold for 45 minutes at 275° C.

After heat treatment, the Wallace plasticity of the resulting adduct is 95.5. The gel content, determined after the adduct has been treated by refluxing tetrahydrofuran for 48 hours, is 70.5 percent. The soluble portion of the adduct contains 1.5 percent combined maleic anhydride by infrared spectrum analysis. The insoluble portion is too highly cross-lined to be processed into a film for infrared analysis, and cannot be processed on a rubber mill.

The procedure is repeated with the peroxide being increased to 0.386 gram and the temperature reduced to 200° C. The product is sufficiently cross-linked that a film cannot be pressed. By blending the product with equal amounts of untreated polymer, a film can be pressed and the maleic anhydride content of the product is determined to be 1.4 percent. This copolymer is too highly cross-linked to be compounded on a rubber mill.

EXAMPLE 5

A mixture of 100 grams of copolymer EPHD and 6.0 grams of maleic anhydride is prepared on a rubber mill and then heated in a closed mold at 270° C. for 45 minutes. The resulting adduct contains 1.8 percent maleic anhydride and has a gel content less than 5 percent. The Wallace plasticity at 100° C. is 43.

The adduct is compounded on a rubber mill in the following proportions:

| | |
|---|---|
| Adduct | 100 parts |
| FEF Carbon Black(1) | 100 parts |
| Naphthenic processing oil(2) | 50 parts |
| 11-Aminoundecanoic acid | 4 parts |
| Zinc Oxide | 10 parts |

(1)ASTM Designation N-550
(2)ASTM Designation D-2226 type 103 oil. Saybolt Universal Viscosities 87.2/2525 at 210° F./100° F.

A 3 inch×6 inches sheet is cured in a closed mold for 30 minutes at 160° C. The cured product exhibits the following properties.

| | |
|---|---|
| $M_{100}$, Kg/cm$^2$ | 59.1 |
| $M_{200}$, Kg/cm$^2$ | 123.7 |
| $T_B$, Kg/cm$^2$ | 172.3 |
| $E_B$, % | 370 |
| Permanent Set at Break, % | 12 |
| Hardness, Shore A | 75 |

EXAMPLE 6

A. Grafting with Bromomaleic Anhydride

On a well-ventilated mill at 45° C., 50.9 grams of bromomaleic anhydride are compounded with 500 grams of copolymer EPHD. The compounded stock is heated for 30 minutes at 260° C. in a 12 inch×12 inch×0.5 inch mold, and then cooled. A 10-gram sample of the resulting adduct is dissolved by shaking for three days in hexane. After precipitation by slow addition of acetone, the adduct is dried for five hours at 70° C. in vacuo. The dried adduct is then pressed into a film, stretched over salt plates, and scanned by infrared spectroscopy (IR). The spectrum contains two absorptions, at 5.3μ and 5.6μ, characteristic of an anhydride group. Assuming that the molar extinction coefficient of the bromosuccinic anhydride group is similar to that of the succinic anhydride function, the film is calculated to contain 1.45 prcent anhydride for an 18 percent conversion. Gel content is less than 5 percent.

In a second run, identical to the first, some hexane insoluble material (3.5 wt. percent) is removed by filtration through cheesecloth prior to isolation of the adduct. Precipitation, drying, and analysis as above shows incorporation of 1.1 weight percent anhydride for a 14 percent conversion. Gel content is less than 5 percent.

B. Grafting with Dichloromaleic Anhydride

Using the same procedures as in (A), 500 grams of copolymer EPHD is compounded with 49.9 grams of dichloromaleic anhydride a sample is heated for 30 minutes at 260° C. in a 12 inch×12 inch×0.075 inch mol and then cooled. Resulting adduct readily dissolves in tetrahydrofuran. The adduct is precipitated, dried, and scanned by IR, showing 2.9 weight percent anhydride for a 38 percent conversion. Gel content is less than 5 percent.

A second sample is heated for 30 minutes at 225° C. in a 1 inch×5 inch×0.075 inch mold, and then cooled. Resulting adduct can be pressed into a film and it dissolves readily in hexane. Precipitation, drying, and IR analysis shows 2.3 weight percent anhydride for a 29 percent conversion. A third sample, treated as above but using a 12 inch×12 inch×½ inch mold contains 1.3 weight percent ahydride for a 17 percent conversion. Gel content remains less than 5 percent.

EXAMPLE 7 copolymer used in this example has a Mooney viscosity (ML−1+4/121° C.) of about 32 and the following monomer unit composition: ethylene, 50.6 percent; propylene, 45 percent; 5-ethylidene-2-norbornene, 4.4 percent. It has an inherent viscosity of 1.93 as measured on a solution of 0.1 gram copolymer in 100 ml of tetrachloroethylene at 30° C. This copolymer is identified as copolymer EPND.

Six grams of maleic anhydride are mixed with 100 grams copolymer EPND of a cold, especially well ventilated 4 inch×8 inch rubber mill operated with a sufficiently large nip to minimize shearing action. The mixture is then heated in a press mold at 270±10° C. for 45 minutes uner a pressure of 2110 kg/cm$^2$ gage. Unreacted maleic anhydride fumes escape on release of the pressure. Resulting adduct is cooled to room temperature.

Gel content of the adduct is less than about 5 percent. Five (5.0) grams of the adduct are dissolved in tetrahydrofuran and precipitated by the addition of acetone. The adduct is then dried for 24 hours under a slight nitrogen flow in a vacuum oven held at 125° C. An infrared spectrum of the resulting film shows presence of anhydride moiety in an amount equal to 0.73 percent by weight maleic anhydride, for a conversion of 12 percent.

The maleated EPND copolymer, an unmaleated EPND copolymer copolymer and a malleated EPHD copolymer (0.7 percent combined maleic anhydride)

comparative sample are compounded on a rubber mill with the following ingredients:

| | |
|---|---|
| Polymer | 100 parts |
| FEF Black[1] | 100 parts |
| Naphthenic processing oil[1] | 50 parts |
| 11-Aminoundecanoic acid | 4 parts |
| Zinc oxide | 10 parts |

[1]As identified in Example 5

Slabs of the compounded polymer are cured in a press for 30 minutes at 160° C. Stress-strain properties are measured on an Instron tensile tester and results are recorded in Table I.

TABLE I

| | Control EPND Copolymer (unmaleated) | Maleated EPND Copolymer | Maleated EPND Copolymer |
|---|---|---|---|
| $M_{100}$, Kg/cm$^2$ | 13.0 | 19.0 | 34.1 |
| $M_{200}$, Kg/cm$^2$ | 13.0 | 28.5 | 66.8 |
| $M_{300}$, Kg/cm$^2$ | — | 38.0 | 86.1 |
| $T_B$, Kg/cm$^2$ | 12.7 | 43.9 | 89.8 |
| $E_B$, % | 245 | 425 | 365 |
| Permanent Set at Break, % | 49 | 29 | 8.5 |

EXAMPLE 8

An adduct of copolymer EPHD containing 3.7 percent combined maleic anhydride is compounded with FEF black (ASTM designation N-550)on a 4 inch×8 inch rubber mill in the proportion of 200 grams adduct to 100 grams FEF black. Zinc oxide or magnesium oxide is milled into this stock as indicated in Table II and slabs 75 mils thick are pressed at 180° C. for 30 minutes. Table I shows Instron stress-strain properties for dumbells subsequently cut from these slabs and pulled at 25° C. and 100° C. The 100° C. test is performed on samples preheated 10 minutes at the test temperature. Both magnesium oxide and zinc oxide stocks retain good properties at 100° C.

TABLE II

| | ZnO, 4 phr | ZnO, 6 phr | MgO, 2 phr | MgO 4 phr |
|---|---|---|---|---|
| 25° C. test | | | | |
| $M_{100}$, Kg/cm$^2$ | 53 | 67 | 56 | 53 |
| $M_{200}$, Kg/cm$^2$ | 112 | 140 | 92 | 105 |
| $M_{300}$, Kg/cm$^2$ | 169 | 197 | 134 | 144 |
| $T_B$, Kg/cm$^2$ | 176 | 204 | 144 | 151 |
| $E_B$, % | 340 | 335 | 455 | 350 |
| Permanent Set at Break, % | 5 | 5 | 15 | 10 |
| 100° C. test | | | | |
| $M_{100}$, Kg/cm$^2$ | 42 | 56 | 21 | 28 |
| $M_{200}$, Kg/cm$^2$ | 49 | 74 | 21 | 28 |
| $M_{300}$, Kg/cm$^2$ | 56 | 81 | — | — |
| $T_B$, Kg/cm$^2$ | 56 | 84 | 21 | 28 |
| $E_B$, % | 320 | 320 | 260 | 260 |
| Permanent Set at Break, % | 70 | 39 | 74 | 58 |
| Compression set | | | | |
| 22 hrs. at 70° C. Test at 25° C. | 92 | 87 | 98 | 100 |
| Shore A hardness | | | | |
| Test at 25° C. | 75 | 77 | 74 | 76 |

EXAMPLE 9

To demonstrate the time dependence on the ionic cure, an adduct of copolymer EPHD containing 2 percent grafted maleic anhydride is compounded on a rubber mill in the following proportions:

| | |
|---|---|
| Adduct | 100 parts |
| FEF black[1] | 100 parts |
| Naphthenic petroleum oil[1] | 50 parts |
| Stearic acid | 2 parts |
| Zinc oxide | 10 parts |

[1]As identified in Example 5

Physical properties are measured after heat treating the compounded adduct in a press for various times at 160° C. Results are given in Table III.

TABLE III

| Cure time (min.) | 5 | 10 | 20 | 30 | 60 |
|---|---|---|---|---|---|
| $M_{100}$, kg/cm$^2$ | 16 | 20 | 26 | 55 | 73 |
| $M_{300}$, kg/cm$^2$ | 40 | 53 | 78 | 126 | 168 |
| $T_B$, kg/cm$^2$ | 49 | 63 | 90 | 130 | 173 |
| $E_B$, % | 590 | 530 | 450 | 360 | 345 |
| Permanent set at break, % | 41 | 27 | 14 | 5 | 10 |
| Hardness, Shore A | 59 | 62 | 63 | 72 | 73 |

EXAMPLE 10

Sample A is prepared in the same manner as shown in Example 9 except for the substitution of zinc acetate dihydrate accelerator for stearic acid. Sample B has the same formulation as Sample A but is prepared by mixing the curing ingredients with a black-oil masterbatch for 10 minutes in a Brabender internal mixer at 160° to 190° C. Data of Table IV demonstrates that hot mixing results in a composition which is more rapidly cured.

TABLE IV

| Press Cure | Sample A 25 min at 160° C. | Sample B 5 min. at 160° C. |
|---|---|---|
| $M_{100}$, kg/cm$^2$ | 33 | 58 |
| $M_{300}$, kg/cm | 61 | — |
| $T_B$, kg/cm$^2$ | 70 | 157 |
| $E_B$, % | 480 | 280 |
| Permanent set at break, % | 22 | 7 |

EXAMPLE 11

An adduct of copolymer EPHD containing 3.7 percent maleic anhydride is mill-mixed with 50 parts FEF black per 100 parts adduct. Slabs of resulting composition, 75 mils and 25 mils thick, are exposed to gaseous ammonia for 5 minutes at room temperature. Properties of the black loaded treated adduct are then measured and recorded in Table V.

For comparison copolymer EPHD is compounded on a rubber mill in a standard recipe of one part stearic acid, 5 parts zinc oxide, 80 parts FEF black, 40 parts paraffinic petroluem oil, 0.5 part tetramethylthiuran disulfide, 1.5 parts sulfur, 1 part 2,2'-dithiobis(benzothiazole), and 2 parts zinc dibutyldithiocarbamate per 100 parts terpolymer. The compounds stock is cured 10 minutes at 160° C. and properties are measured and recorded in Table V.

TABLE V

| | Sulfur cured Copolymer EPHD* | Ammonia Treated 75-mil slab of adduct | Ammonia Treated 25-mil slab of adduct |
|---|---|---|---|
| $M_{100}$, kg/cm$^2$ | — | 46 | 63 |
| $M_{200}$, kg/cm$^2$ | 83 | 91 | 120 |

TABLE V-continued

| | Sulfur cured Copolymer EPHD* | Ammonia Treated 75-mil slab of adduct | Ammonia Treated 25-mil slab of adduct |
|---|---|---|---|
| $M_{300}$, kg/cm$^2$ | — | 134 | 170 |
| $T_B$, kg/cm$^2$ | 151 | 141 | 176 |
| $E_B$, % | 370 | 330 | 330 |
| Permanent Set at Break | — | 8 | 8 |

*Control

EXAMPLE 12

To demonstrate comparability of cure, an adduct of copolymer EPHD containing 2 percent maleic anhydride is compounded with carbon black processing oil, stearic acid, zinc oxide, and hydrated zinc acetylacetonate in proportions shown in Table IV to form a masterbatch A. A masterbatch B is also prepared using the same terpolymer, without maleic anhydride, and standard sulfur curing agents in proportions shown in Table VI. Samples from both masterbatches are cured at 160° C. for 30 minutes, and the properties are then measured. Results are tabulated in Table VI.

TABLE VI

| | Masterbatch A | Masterbatch B Control |
|---|---|---|
| Copolymer EPHD adduct | 100 | — |
| Copolymer EPHD | — | 100 |
| FEF Black(1) | 100 | 100 |
| Naphthenic Oil(1) | 50 | 50 |
| Stearic acid | 2 | 1 |
| Zinc Oxide | 5 | 5 |
| Zinc dibutyldithiocarbamate | — | 2 |
| Tetramethylthiuram disulfide | — | 0.5 |
| 2-Mercaptobenzothiazole | — | 1 |
| Sulfur | — | 1.5 |
| Zinc acetylacetonate, hydrated | 2.8 | — |
| Hardness, Shore A | 73 | 69 |
| $M_{100}$, kg/cm$^2$ | 65 | 79 |
| $M_{200}$, kg/cm$^2$ | 124 | 150 |
| $M_{300}$, kg/cm$^2$ | 170 | — |
| $T_B$, kg/cm$^2$ | 186 | 163 |
| $E_B$, % | 355 | 226 |
| Permanent Set at Break, % | 15 | 2 |

EXAMPLE 13

A. Tetrapolymer

Copolymer used in this example is a branched tetrapolymer having a Mooney (ML-1+4/121° C.) viscosity of 20 and the following monomer unit composition: ethylene, 70 percent; propylene, 23 percent; 1,4-hexadiene, 6.75 percent; 2,5-norbornadiene, 0.25 percent. It has an inherent viscosity of 1.2 as measured on a sample of 0.1 gram tetrapolymer in 100 milliliters of tetrachloroethylene at 30° C. There are about 0.54 gram-moles of ethylenic side-chain groups per kilogram of tetrapolymer.

B. Adduct of tetrapolymer and maleic anhydride

A heavy-duty single screw type extruder is used having a 1.5-inch I.D. barrel. The length is apportioned as follows: feed section, 10.5 inches; compression section, 6.5 inches; injection section, 1.625 inches; mixing torpedo, 5.5 inches; and the second mixing section, 8.5 inches. The extruder is jacketed and heated by oil circulating at 308° to 318° C. Temperature inside the barrel is at least 260° C. and the pressure is 28.1 to 35.2 kg/cm$^2$. The screw turns at 15 rpm.

Copolymer of part A is added to the feed hopper at a rate of 2.74 kg/hr.; maleic anhydride is injected at the beginning of the mixing section at the rate of 0.17 kg/hr. Resulting adduct leaves the extruder and is passed directly into water where cooling and extraction of some of the unreacted maleic anhydride occur. Adduct is then freed from water and additional unreacted maleic anhydride in a vacuum oven at 100° C. Gel content of the adduct is lss than 5 percent.

C. Thermoplastic Elastomer

Adduct of Part B is compounded on a rubber roll mill according to the following recipes:

| Component | Sample A | Sample B |
|---|---|---|
| Adduct | 100 | 100 |
| 4,4'-Thio-bid(6-tert-butyl-m-cresol) | 0.5 | 0.5 |
| FEF carbon black(1) | 100 | 0 |
| Naphthenic petroleum oil(2) | 75 | 60 |
| Hard kaolin clay(3) | 0 | 100 |
| $TiO_2$(4) | 0 | 20 |
| $H_2N(CH_2)_3CO_2H$ | 3 | 3 |
| ZnO | 2.7 | 2.7 |

(1)ASTM Designation N-550

(2)ASTM D-2226 type 103 oil. Saybolt Universalt Viscosities 87.2/2525 at 210°/100° F.

(3)Equivalent analysis: 44–46% silica, 37.5–39.5% alumina, 1.5–2% iron oxide, and 1–2% titanium dioxide, ignition loss 13.9–14.2%. Specific gravity of 2.60, pH in water 4.5–5.5. 325 mesh residue of 0.17%.

(4)"Ti-Pure" 902 by Du Pont.

Compounding of adduct with antioxidant and carbon black or clay (Samples A and B respectively) is at about 100° C. Thereafter the temperature is lowered to about 50° C. and the remaining components are incorporated, with zinc oxide being incorporated last. The resulting compositions are heated at 100° C. for one hour in an oven to form the corresponding thermoplastic elastomers which are then cooled and chopped into small pellets.

D. Extrusion of Thermoplastic Elastomers

Pellets of black loaded elastomers (Sample A of Part C) are added to the feed hopper of an injection molding machine having barrel and nozzle temperatures about 250° C., booster injection pressure of 70.3 kg/cm$^2$, fast ram speed and 96 rpm screw speed. A 20-sec./20-sec. filling/cooling cycle is employed. The mold temperature is 114° C. Typical extrudates are shiny ans smooth with excellent die definition. Shrinkage is 7.5 percent.

Pellets of clay loaded elastomer (Sample B of Part C) are injection molded using the same machine but with a barrel and nozzle temperature about 225° C.; booster injection pressure of 57.6 kg/cm$^2$, and mold temperature of 80° C. Ram speed, screw speed, and filling/cooling cycle is the same. Smooth extrusion occurs; shrinkage is 8 percent. When hot, the clay loaded compounds are quite tacky. Their surfaces are somewhat matted by demolding.

EXAMPLE 14

This example demonstrates remolding of the thermoplastic elastomer.

The following ingredients are mixed for 10 minutes at 200° C. in a Brabender plastograph operated at 100 rpm:

| | |
|---|---|
| Copolymer EPHD adduct(1) | 100 parts |
| FEF Carbon Black(2) | 100 parts |
| Naphthenic petroleum oil(2) | 50 parts |

-continued

| | |
|---|---|
| 4,4'-Thio-bis(6-tert-butyl-m-cresol) | 1 part |
| Stearic acid | 13 parts |
| Zinc oxide | 7 parts |

(1)Containing 2.2% grafted maleic anhydride
(2)Same as in Example 13

Thermoplastic elastomer thus obtained is pressed into a sheet at 200° C. and then compression molded into a 3 inch×6 inch×0.075 inch slab and into Yerzley pellets at 200° C. for 10 minutes. Physical properties are tested and recorded in Table VII for this first molding. After physical testing, the remains are pressed into a 1 inch×5 inch×0.075 inch slab at 200° C. for 10 minutes and retested after this second molding. Test remains are again remolded at 200° C. for 10 minutes and retested after the third molding. Results are shown in Table VII.

| Molded | Once | Twice | Thrice |
|---|---|---|---|
| $M_{100}$, kg/cm$^2$ | 88.6 | 98.4 | 96.0 |
| $M_{200}$, kg/cm$^2$ | 168 | 177 | 182 |
| $T_B$, kg/cm$^2$ | 202 | 197 | 199 |
| $E_B$, % | 290 | 245 | 255 |
| Shore A hardness | 71 | 71 | 71 |

What is claimed is:

[1. An adduct of maleic anhydride and an elastomeric copolymer of ethylene, at least one $C_3$to $C_6$ α-olefin, and at least one nonconjugated diene; the adduct having an inherent viscosity of at least one as measured on 0.1 gram of adduct dissolved in 100 milliliters of perchloroethylene at 30° C. and having a gel content less than about 5 percent as measured by weight percent adduct insoluble in boiling tetrahydrofuran at atmospheric pressure after 48 hours.]

[2. The adduct of claim 1 wherein the elastomeric copolymer is a copolymer of ethylene, propylene, and at least one of a linear aliphatic diene of at least six carbon atoms having one terminal double bond, and a cyclic diene with at least one double bond in a cyclic ring.]

[3. The adduct of claim 1 wherein the elastomeric copolymer is a copolymer of ethylene, propylene, and 1,4-hexadiene having an inherent viscosity of at least about 1.5, and the adduct contains about 0.5 to 9 percent by weight maleic anhydride.]

[4. The adduct of claim 3 wherein the adduct contains about 1 to 4 percent by weight maleic anhydride and has a gel content less than about 2 percent.]

[5. The adduct of claim 1 wherein the elastomeric copolymer is a copolymer of ethylene, propylene, and at least one of an alkylidene bicycloalkene, alkenyl bicycloalkene, bicycloalkadiene, and an alkenyl cycloalkene.]

[6. The adduct of claim 5 wherein the nonconjugated diene is 5-ethylidene-2-norbornene, the elastomeric copolymer has an inherent viscosity of about 1.5 to 3.0, and the adduct contains about 0.5 to 9 percent by weight maleic anhydride.]

[7. The adduct of claim 1 wherein the elastomeric copolymer is a copolymer of ethylene, propylene, a monoreactive nonconjugated diene, and at least one direactive nonconjugated diene.]

[8. The adduct of claim 7 wherein the elastomeric copolymer is a tetrapolymer of ethylene, propylene, 1,4-hexadiene, and 2,5-norbornadiene having an inherent viscosity of about 1.2 to 3.0; and the adduct contains about 0.5 to 9 percent by weight maleic anhydride.]

[9. A thermoplastic elastomer obtained by curing 1. an adduct of maleic anhydride and an elastomeric copolymer of ethylene, at least one $C_3$ to $C_6$ α-olefin, and at least one nonconjugated diene; the adduct having an inherent viscosity of at least one as measured on 0.1 gram of adduct dissolved in 100 milliliters of perchloroethylene at 30° C. and having a gel content less than about 5 percent as measured by weight percent adduct insoluble in boiling tetrahydrofuran at atmospheric pressure after 48 hours, using an effective amount of
2. a Group II divalent metal salt of a weak, acid, and
3. an accelerator having an active hydrogen atom.]

[10. The thermoplastic elastomer of claim 9 wherein the adduct is an ethylene/propylene/nonconjugated diene copolymer containing about 0.5 to 9 percent by weight maleic anhydride and the accelerator is at least one of water, mercaptans, thiols, phenols, organic acids, alcohols, and amines.]

[11. The thermoplastic elastomer of claim 10 whwerein the copolymer is an ethylene/propylene,5-ethylidene-2-norbornene terpolymer.]

[12. The thermoplastic elastomer of claim 10 wherein the copolymer is ana ethylene/propylene/1,4-hexadiene/2,5-norbornadiene tetrapolymer.]

[13. The thermoplastic elastomer of claim 10 wherein the copolymer is an ethylene/propylene/1,4-hexadiene terpolymer.]

[14. The thermoplastic elastomer of claim 9 wherein the copolymer is an ethylene/propylene/1,4-hexadiene terpolymer having an inherent viscosity of at least 1.5, and said adduct contains about 1 to 4 percent by weight maleic anhydride.]

[15. The thermoplastic elastomer of claim 14 wherein said accelerator is at least one of zinc acetate dihydrate, hydrated zinc acetylacetone, and hydrated zinc catecholate.]

[16. The thermoplastic elastomer of claim 14 wherein zinc oxide is also present.]

[17. The method of preparing an elastomeric adduct containing maleic anhydride, the adduct having a gel content less than about 5 percent as measured by weight percent adduct insoluble in boiling tetrahydrofuran at atmospheric pressure after 48 hours consisting essentially of 1. mixing
   A. an elastomeric copolymer of ethylene, at least one $C_3$ to $C_6$ α-olefin, and at least one nonconjugated diene, the copolymer having an inherent viscosity of at least one as measured on 0.1 gram copolymer dissolved in 100 milliliters of perchloroethylene at 30° C., and
   B. maleic anhydride, and d
2. heating the mixture to a temperature of about 225° to 350° C.]

[18. The method of claim 17 wherein the copolymer is a copolymer of ethylene, propylene, and at least one of a linear aliphatic diene of at least six carbon atoms having one terminal double bond, and a cyclic diene with at least one double bond in a cycle ring.]

[19. The method of claim 17 wherein the copolymer is an ethylene/propylene/1,4-hexadiene terpolymer having an inherent viscosity of at least 1.5.]

[20. The method of claim 17 wherein the copolymer is an ethylene/propylene/1,4-hexadiene/2,5-norbornadiene tetrapolymer having an inherent viscosity of about 1.2 to 3.0.]

[21. The method of claim 17 wherein the copolymer is an ethylene/propylene/5-ethylidene-2-norbornene terpolymer having an inherent viscosity of 1.5 to 3.0.]

[22. A method of preparing a thermoplastic elastomer, said method comprising the following steps:

1. mixing
   A. an adduct of maleic anhydride with an ethylene/propylene/1,4-hexadiene terpolymer, the proportion of maleic anhydride being about 1–4 weight percent of the adduct; the gel content of the adduct being less than about 2 weight percent as measured by the proportion of adduct insoluble in boiling tetrahydrofuran at atmospheric pressure for 48 hours; and the inherent viscosity of the adduct being at least 1 as measured on 0.1 gram of adduct dissolved in 100 ml. of perchloroethylene at 30° C.; and
   B. an amount of at least one zinc salt selected from the group consisting of zinc acetate dihydrate, hydrated zinc acetylacetone, and hydrated zinc catecholate effective to cure the adduct;
2. exposing the resulting mixture to at least one accelerator selected from the group consisting of water, mercaptans, phenols, organic acids, alcohols, and amines; and
3. heating the exposed mixture for a sufficient time to cure the adduct.]

*23. The method of preparing an elastomeric adduct containing maleic anhydride, the adduct having a gel content less than about 5 percent as measured by weight percent adduct insoluble in boiling tetrahydrofuran at atmospheric pressure after 48 hours consisting of*

*1. mixing*
   *A. an elastomeric copolymer of ethylene, at least one $C_3$ to $C_6$ α-olefin and at least one nonconjugated diene selected from 1,4-hexadiene, 5-alkylidene-2-norbornenes, and a combination of either of the above with at least one of 2,5-norbornadiene and 1,7-octadiene, the copolymer having an inherent viscosity of at least one as measured on 0.1 gram copolymer dissolved in 100 milliliters of perchloroethylene at 30° C., and*
   *B. maleic anhydride, and*
*2. heating the mixture to a temperature of about 225° to 350° C.*

*24. The method of claim 23 wherein the copolymer is an ethylene/propylene/1,4-hexadiene terpolymer having an inherent viscosity of at least 1.5.*

*25. The method of claim 23 wherein the copolymer is an ethylene/propylene/1,4-hexadiene/2,5-norbornadiene tetrapolymer having an inherent viscosity of about 1.2 to 3.0.*

*26. The method of claim 23 wherein the copolymer is an ethylene/propylene/5-ethylidene-2-norbornene terpolymer having an inherent viscosity of at least 1.5 to 3.0.*

*27. The method of preparing a thermoplastic elastomer, said method comprising the following steps:*

*1. mixing*
   *A. an adduct of maleic anhydride with an ethylene/propylene/1,4-hexadiene terpolymer, the proportion of maleic anhydride being about 1–4 weight percent of the adduct; the gel content of the adduct being less than about 2 weight percent as measured by the proportion of adduct insoluble in boiling tetrahydrofuran at atmospheric pressure for 48 hours, and the inherent viscosity of the adduct being at least 1 as measured on 0.1 gram of adduct dissolved in 100 ml. of perchloroethylene at 30° C.; and,*
   *B. an amount of at least one zinc salt selected from the group consisting of zinc acetate dihydrate, hydrated zinc acetylacetone, and hydrated zinc catecholate effective to cure the adduct;*
*2. exposing the resulting mixture to at least one accelerator selected from the group consisting of water, mercaptans, phenols, organic acids, alcohols, and amines; and*
*3. heating the exposed mixture for a sufficient time to cure the adduct.*

* * * * *